(12) United States Patent
Wiggins (10) Patent No.: US 9,476,749 B1
(45) Date of Patent: Oct. 25, 2016

(54) NESTING MEASURING CUPS

(71) Applicant: Dart Industries Inc., Orlando, FL (US)

(72) Inventor: James Michael Wiggins, Orlando, FL (US)

(73) Assignee: Dart Industries Inc., Orlando, FL (US)

( * ) Notice: Subject to any disclaimer, the term of this patent is extended or adjusted under 35 U.S.C. 154(b) by 56 days.

(21) Appl. No.: 14/717,355

(22) Filed: May 20, 2015

(51) Int. Cl.
*G01F 19/00* (2006.01)
*B65D 21/02* (2006.01)

(52) U.S. Cl.
CPC ........... *G01F 19/00* (2013.01); *B65D 21/0233* (2013.01)

(58) Field of Classification Search
CPC .. G01F 11/263; G01F 11/268; G01F 19/002; G01F 19/00; B65D 21/00; B65D 21/0233
See application file for complete search history.

(56) References Cited

U.S. PATENT DOCUMENTS

| | | | | |
|---|---|---|---|---|
| 2,042,945 | A * | 6/1936 | Lemay | G01F 19/002 73/426 |
| 2,587,344 | A * | 2/1952 | Livingstone | B65D 23/06 222/471 |
| 2,654,252 | A * | 10/1953 | Davis | A47G 21/04 30/324 |
| 3,030,812 | A * | 4/1962 | Lutz | G01F 19/002 30/324 |
| 3,400,591 | A * | 9/1968 | Larson | G01F 19/002 30/324 |
| D215,331 | S | 9/1969 | Swett et al. | |
| 3,526,138 | A * | 9/1970 | Swett | G01F 19/002 206/514 |
| 3,921,862 | A * | 11/1975 | Holmstrom | G01F 11/261 222/305 |
| 4,043,203 | A * | 8/1977 | Montesi | G01F 19/002 30/324 |
| 4,079,629 | A * | 3/1978 | Hope | G01F 19/00 116/227 |
| D259,461 | S | 6/1981 | Daenen et al. | |
| D259,462 | S | 6/1981 | Daenen et al. | |
| 4,416,381 | A * | 11/1983 | Swartwout | B65D 41/26 215/228 |
| D302,089 | S * | 7/1989 | Ancona | G01F 19/002 D10/46.2 |
| D303,056 | S * | 8/1989 | Prindle | G01F 19/002 D10/46.2 |
| 5,662,249 | A * | 9/1997 | Grosse | B65D 47/147 141/319 |
| D394,217 | S | 5/1998 | Laib | |
| 5,850,944 | A * | 12/1998 | Robbins, III | B65D 47/0866 222/158 |
| D437,793 | S * | 2/2001 | Kaposi | G01F 19/00 D10/46.2 |
| D438,125 | S * | 2/2001 | Kaposi | G01F 19/002 D10/46.2 |
| D440,164 | S * | 4/2001 | Kerr | G01F 19/00 D10/46.3 |

(Continued)

FOREIGN PATENT DOCUMENTS

CN EP 1990614 A2 * 11/2008 ............. G01F 19/00

*Primary Examiner* — Harshad R Patel
*Assistant Examiner* — Samir M Shah
(74) *Attorney, Agent, or Firm* — Taylor J. Ross (57) ABSTRACT

Nesting measuring cups include a first measuring cup having a measuring portion for measuring a first volume, a first handle provided on first measuring portion, and measuring cup includes upper and lower faces. A first pour spout on first measuring portion has two spaced apart end walls defining pour spout. A second measuring cup has a second measuring portion for measuring a second volume and a second handle. Second measuring volume is smaller than first measuring volume and nests inside it. A second pour spout is on second measuring portion, and a post is provided adjacent lower face of second measuring portion. Post is engageable with a stop on upper face of first measuring portion, so user may rotate second measuring cup relative to first measuring cup until post engages stop, stops rotation of first and second measuring cups relative to each other, and achieves fixed fanned out position.

11 Claims, 7 Drawing Sheets

(56) References Cited

U.S. PATENT DOCUMENTS

| | | | |
|---|---|---|---|
| 6,296,210 B1 * | 10/2001 | Kelley | A47F 5/0006 248/222.14 |
| D548,115 S * | 8/2007 | Sawhney | B65D 21/00 D10/46.2 |
| D582,798 S * | 12/2008 | Mantilla | B65D 21/00 D10/46.3 |
| D584,968 S * | 1/2009 | Mantilla | G01F 19/002 D10/46.3 |
| 7,753,206 B2 * | 7/2010 | Sawhney | G01F 19/00 206/514 |
| D621,729 S * | 8/2010 | Blust | B65D 21/00 D10/46.3 |
| D624,836 S * | 10/2010 | Blust | B65D 21/00 D10/46.3 |
| D657,265 S | 4/2012 | De Leo | |
| D666,506 S | 9/2012 | De Leo | |
| D666,926 S | 9/2012 | De Leo | |
| 2008/0276705 A1 * | 11/2008 | Yeung | G01F 19/00 73/426 |
| 2009/0045224 A1 * | 2/2009 | Faaborg | B65D 41/0471 222/111 |
| 2012/0167679 A1 * | 7/2012 | Delaney | G01F 19/00 73/429 |
| 2012/0198930 A1 * | 8/2012 | Hood | G01F 19/002 73/429 |
| 2012/0222482 A1 * | 9/2012 | Kern | G01F 19/002 73/426 |
| 2012/0273380 A1 * | 11/2012 | Hood | G01F 19/002 206/499 |
| 2015/0338259 A1 * | 11/2015 | Robbins | G01F 19/00 73/426 |
| 2016/0003658 A1 * | 1/2016 | Holden | G01F 11/268 222/1 |

* cited by examiner

NESTING MEASURING CUPS

CROSS REFERENCE TO RELATED APPLICATIONS

This application is related to co-pending Ser. No. 29/527,586, filed May 20, 2015.

STATEMENT REGARDING FEDERALLY SPONSORED RESEARCH

Not applicable.

BACKGROUND OF THE INVENTION

The present invention relates in general to measuring cups, and more particularly to nesting measuring cups which have measurement indicators, such as printed or embossed indicia on their handles, which handles can be fanned out so that the user may quickly determine which cup is the cup the user wants to use. Even more particularly, the invention relates to measuring cups which can be fanned out in one or both directions so as to display English, (more commonly known as U.S. Standard measures) and/or metric measures depending on the user's preference.

Measuring cups, including measuring cups with handles or other portions having indicia, including nesting measuring cups, are known in the art.

SUMMARY OF THE INVENTION

An object of the present invention is to provide a nesting measuring cup which overcomes the drawbacks of the prior art.

A further object of the present invention is to provide a set of nesting measuring cups which can display one or more types of measurements in a fanned out position.

Another object of the present invention is to provide a set of measuring cups which can alternately display either English or metric measurement, as the user prefers.

A further object of the present invention is to provide a set of nesting measuring cups having handles which can be fanned out, and which have one or more stops for fixing the handles in a pre-determined fanned out position.

These and other objects are achieved by a set of measuring cups having handles which can be fanned out in one or two directions, such as clockwise and counter-clockwise, and which fanned out positions may be fixed in one or more of the fanned out positions including improved features. The inventive nesting measuring cups include a novel combination of a set of nesting measuring cups including a first measuring cup having a measuring portion for holding and measuring a first volume, a first handle provided on the first measuring portion, and the measuring cup including an upper face and a lower face. A first pour spout is provided adjacent to the upper face of the first measuring portion, the first pour spout having two spaced apart end walls defining the first pour spout. Also, a second measuring cup having a second measuring portion for holding and measuring a second volume is provided, as well as a second handle provided on the second measuring portion, the second measuring volume being smaller than the first measuring volume, and the second measuring portion nesting inside the first measuring portion. A second pour spout is provided adjacent the upper face of the second measuring portion; and, a post is provided adjacent the lower face of the second measuring portion, the post being engageable with a stop on the upper face of the first measuring portion, so that the user may rotate the second measuring cup relative to the first measuring cup until the post engages the stop for stopping the rotation of the second measuring cup relative to the first measuring cup.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

With reference to FIGS. 1-6, an embodiment of a set of nesting measuring cups 10 according to the invention is shown. Nesting cups 10 may include a first measuring cup 20 having a measuring portion 24 serving as a nesting portion for holding and measuring a first volume. A first handle 28 may be provided on first measuring portion 24, and the measuring cup 20 may include a measuring indicator or indicia 32, such as the illustrated "⅓ cup 80 mL," an upper face 34 and a lower face 36.

Figures 1, 2:
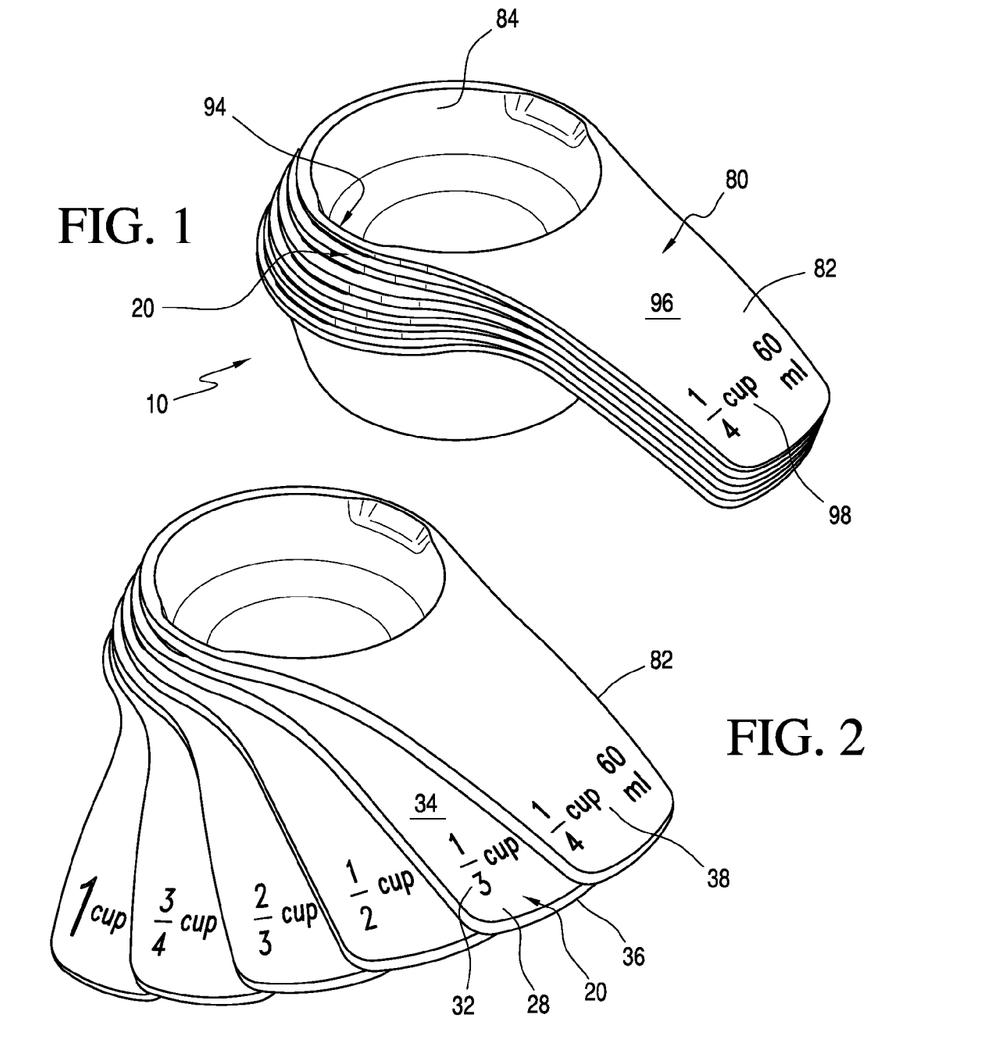
FIG. 1 is a top front perspective view of a first embodiment of a set of nesting measuring cups according to the present invention in a position in which the handles are aligned.
FIG. 2 is a top front perspective view of the embodiment of FIG. 1 in which the handles are fanned out in a counter-clockwise direction so that English measurements are displayed.
Figure 3:
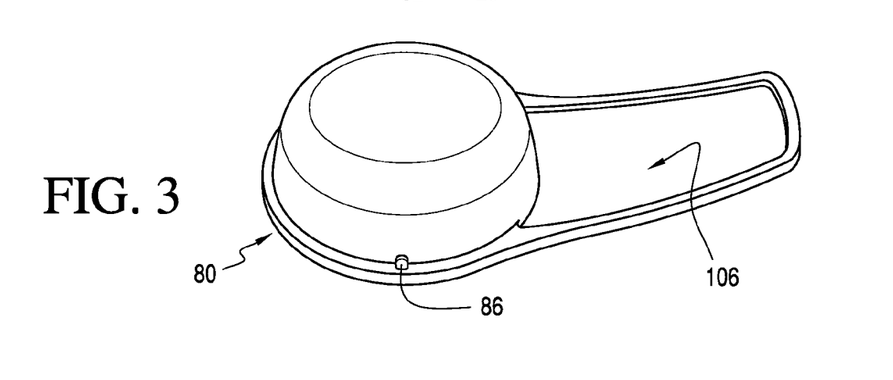
FIG. 3 is a bottom perspective view of one of the nesting measuring cups of FIG. 1.

A first pour spout 40 may be provided on first measuring cup 20 adjacent to upper face 34 of first measuring portion 24, the first pour spout 40 having two spaced apart end walls 44, 46 defining ends of first pour spout 40. End walls 44, 46 each serves as a respective abutment in use, as discussed below.

A second measuring cup 80 having a second measuring portion 84 for holding and measuring a second volume may be provided, as well as a second handle 82 provided on second measuring portion 84. As shown in FIGS. 1-6, second measuring portion 84 is smaller than first measuring portion 24, as will be readily appreciated, because second measuring portion 84 nests within; i.e. fits in, larger first measuring portion 24, as shown. A stop 86 may be provided as best seen in FIGS. 3-6. Stop 86 serves to limit movement when it engages the respective abutments in the form of end walls 44, 46 of spout 40 to fix or stop movement of handles 20 and 80 relative to each other in the fixed fanned positions of FIGS. 2, 5, and 6. A second pour spout 94 may be provided adjacent an upper face 96 of second measuring cup 80. A second volume indicator 98 or measuring indicia 98 may be provided on upper face 96, a second volume indicator 98 may include one or both of English and metric measures, as shown, or measures from another measurement system, as will be readily appreciated. In FIGS. 1-6, second volume indicator 98 has the indicia "¼ cup 60 mL" as those measures are approximately the same. The other measuring cups described below have English and/or metric measurements corresponding to the respective volumes held in the respective measuring portions.

Figures 4, 5, 6:
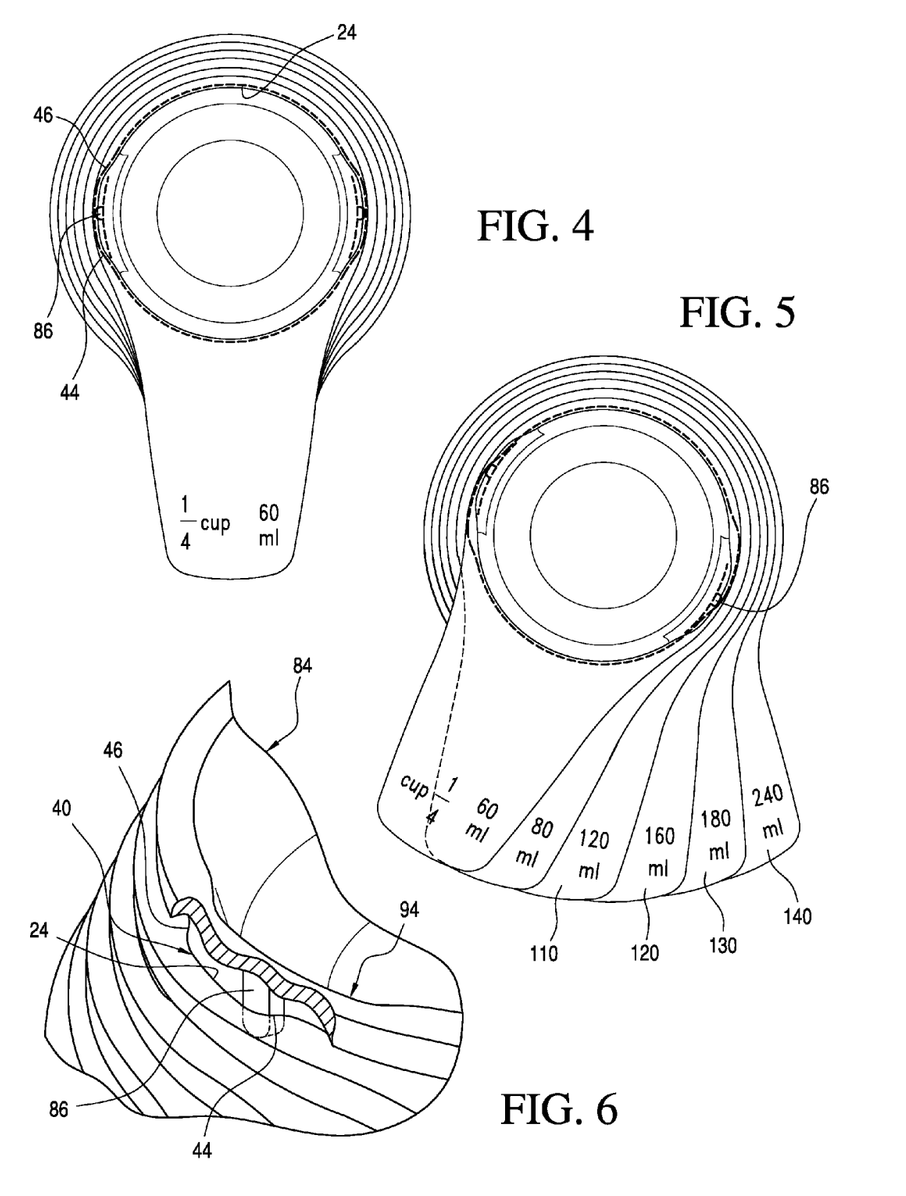
FIG. 4 is a top plan view of the nesting measuring cups of FIG. 1.
FIG. 5 is a top plan view of the measuring cups of FIG. 1 in which the cups have been fanned out in a clockwise direction so that the metric measurements are displayed.
FIG. 6 is a partially broken away top front perspective view of FIG. 2 in which a stop may be seen engaging with an abutment on an upper face of the measuring cup below the top measuring cup for fixing the position of the top measuring cup relative thereto.

As seen in FIGS. 3-6, stop 86 may be in the form of an extension formed on an outer wall of second measuring cup 80, as shown, may be spaced apart from the outer wall of cup 80 as a free-standing extension, or may be provided elsewhere as will be readily appreciated, and as will be described below in relation to further embodiments of the invention. Stop 86 may be provided adjacent a lower face 106 of cup 80 and may be configured for being engageable with one or both of abutments in the form of end walls 44, 46 on upper face 34 of first measuring portion 24. Stop 86 may be located so that a user may rotate second measuring cup 80 relative to first measuring cup 20 until stop 86 engages end wall 46 or 44, as shown, such engagement stops the rotation of first and second cups 20 and 80 relative to each other. As shown in FIG. 2, when the user rotates second cup 80 counter-clockwise as viewed from above, stop 86 engages end wall 44 of spout 40 and moves no further counter-clockwise relative thereto. In that manner, cups 20 and 80 are stopped or fixed in a fanned out configuration as shown in FIGS. 2 and 6, so that the English measurements are visible to the user, as best seen in FIG. 2. As may be best seen by considering the top plan view of FIG. 4, when the handles of first measuring cup 20 and second measuring cup 80 are aligned, stop 86 is engaging neither one of end walls 44 and 46. Thus, the user must align handles 28 and 82 by hand. Thanks to the location of stop 86, as shown, in this embodiment the user is able to fan out the handles in either rotational direction to display the English measurements of FIG. 2 or the metric measurements of FIG. 5.

Thus, if the user would like to measure using metric measurements, then the user would rotate second cup 80 in a clockwise direction, as viewed in FIG. 5. When the user moves second measuring cup 80 clockwise relative to first measuring cup 20, the fanned out position of FIG. 5 is achieved in which the metric measures 60 mL, 80 mL, and so forth are displayed. The clockwise rotation of second cup 80, causes stop 86 to moves clockwise relative to spout 40 of measuring cup 20 until it engages and is stopped by end wall 46 serving as the abutment. As will be readily appreciated, the user when fanning out the measuring cups to display the metric measurements, could have moved first measuring cup 20 counter-clockwise relative to second measuring cup 80 and would have achieved the fanned out position of FIG. 5. As will be readily understood, in the embodiment of FIGS. 1-6, the user could have moved any one of a third measuring cup 110, a fourth measuring cup 120, a fifth measuring cup 130, and a sixth measuring cup 140 to have achieved either the fanned out position of FIG. 5 or the fanned out position of FIG. 2, as shown.

Figure 7:
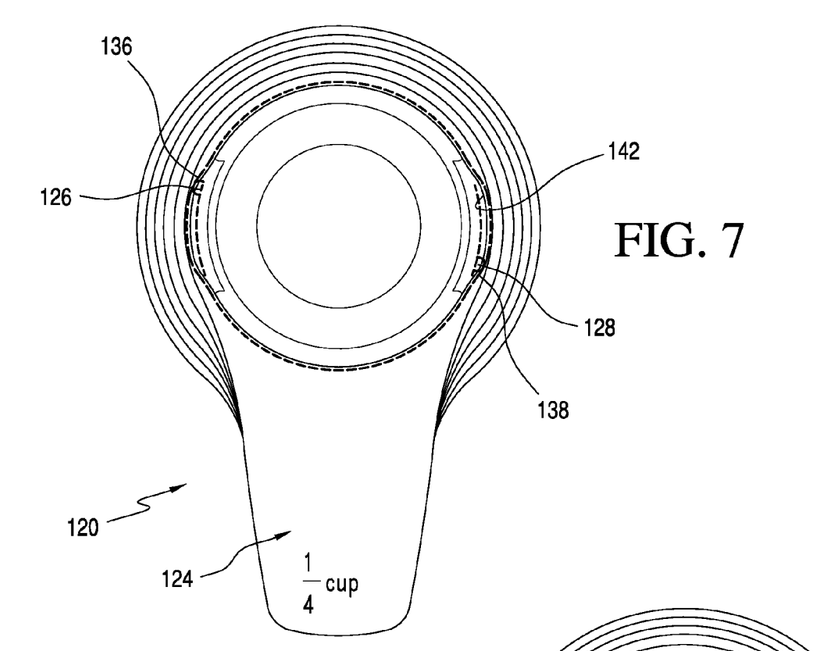
FIG. 7 is a top plan view of another embodiment of the invention with the handles aligned.
Figure 8:
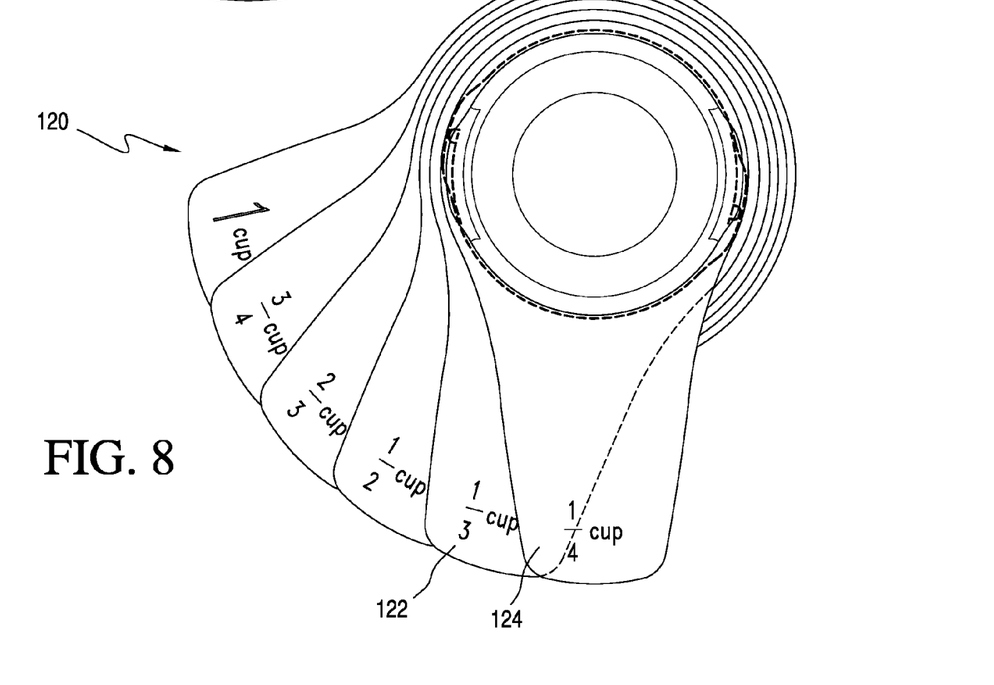
FIG. 8 is a top plan view of FIG. 7 in which the handles are fanned out.

FIGS. 7 and 8 illustrate another embodiment of nesting cups 120 according to the invention. A lower or first cup 122 may be sized so that a second or top cup 124, as shown, may nest therein. Second cup may include a stop in the form of a post or extension 126 which engages an end wall 136 functioning as an abutment, for aligning the handles as in FIG. 7, thanks to the provision of a further post 128 which may engage and be stopped by an end wall or abutment 138 of a further spout 142 as shown. In this embodiment cups 120 fan in only one direction and stops 136 and 138 fix the rotation of the cups in the fanned out position of FIG. 8 and in the aligned position of FIG. 7. Only one type of measurement need be provided, as shown, although a second type of measurement could be provided, although it would be hidden or visible in the fanned out position, depending on the size and location of the second type of measurement.

Figure 9:
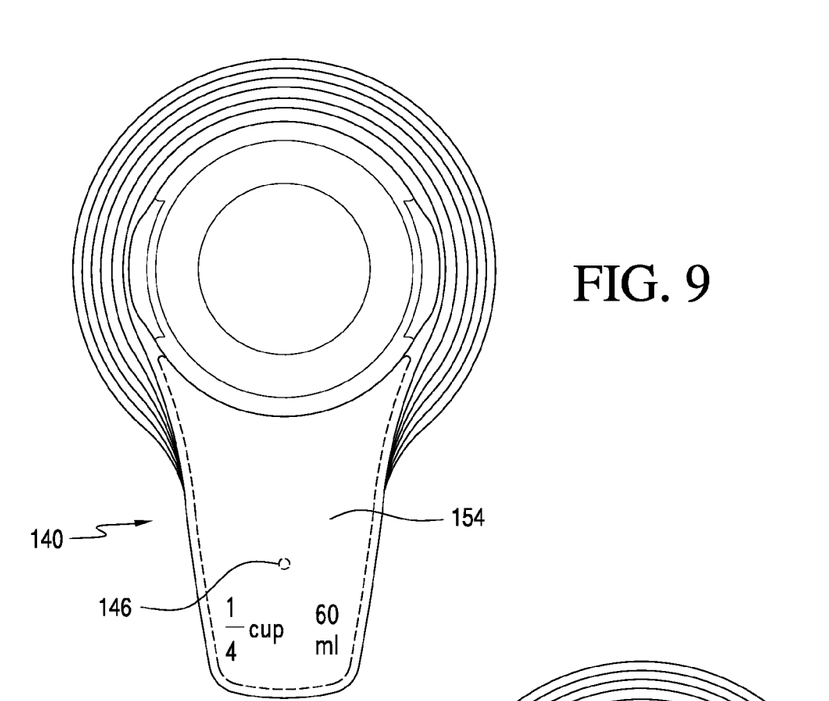
FIG. 9 is a top plan view of another embodiment of the invention with the handles aligned.
Figure 10:
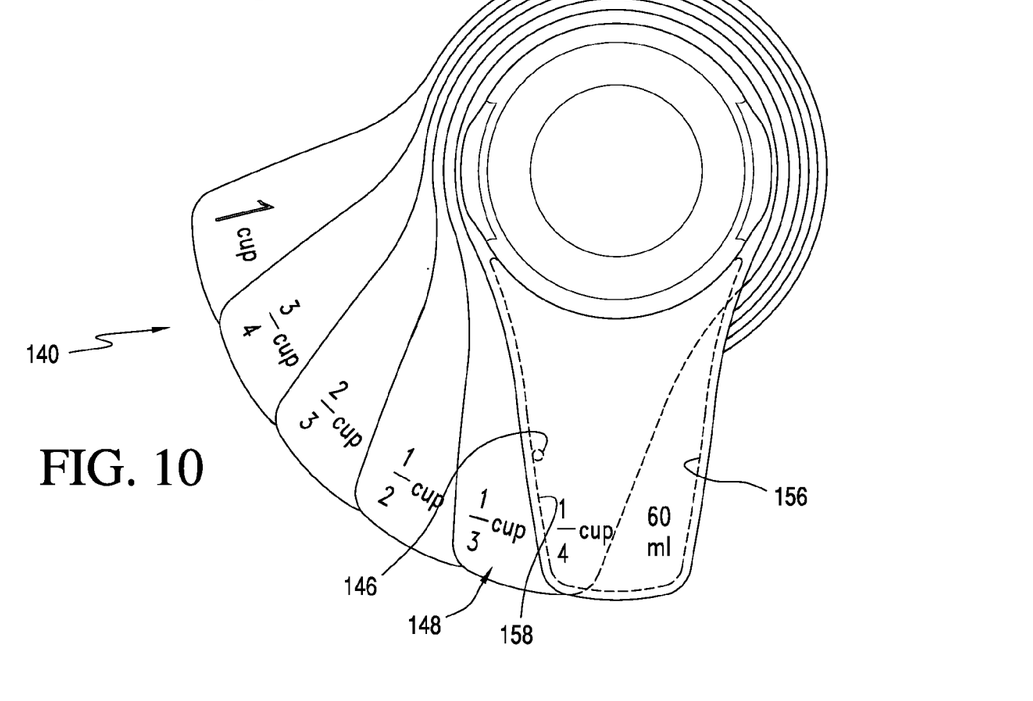
FIG. 10 is a top plan view of the embodiment of FIG. 9 in which the handles are fanned out.

FIGS. 9 and 10 show yet another preferred embodiment of a set of cups 140 according to the invention. Cups 140 include a stop in the form of a post 146 on a lower cup 148, post 146 being located so as engage respective abutments in the form of side walls 156 and 158 of an upper cup 154 to provide rotation and fanning of respective cups in both directions, i.e. both clockwise and counter-clockwise, the clockwise fanned position being shown in FIG. 10. Given the location of post 146 in this embodiment the user aligns the handles by hand such as shown in FIG. 9. Measuring indicia may be provided.

Figure 11:
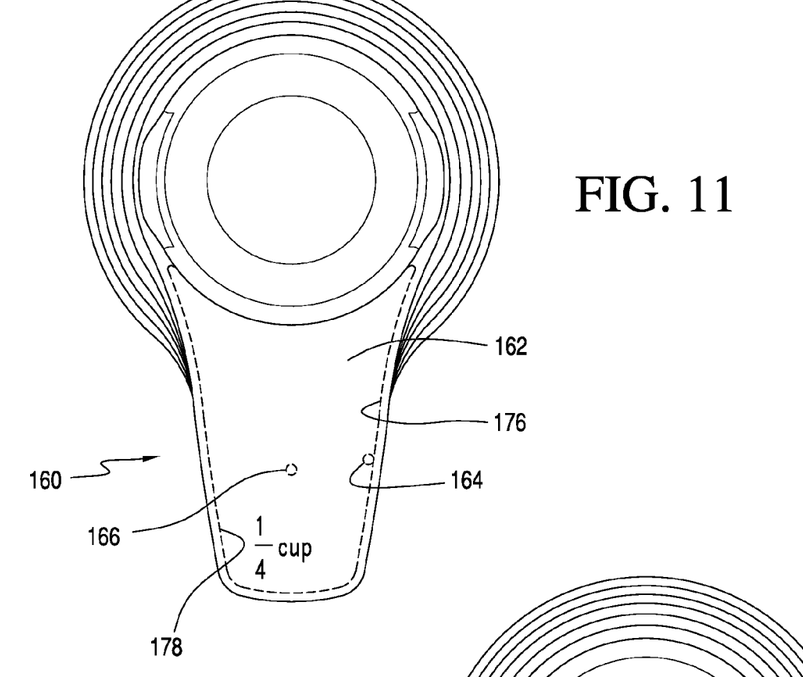
FIG. 11 is a top plan view of a further embodiment of the invention with the handles aligned.
Figure 12:
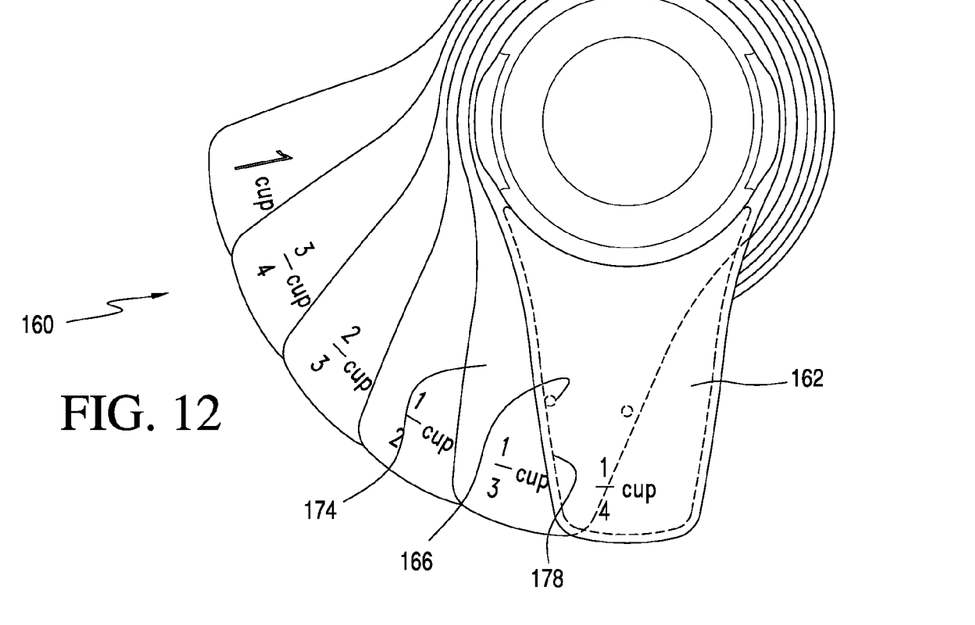
FIG. 12 is a top plan view of FIG. 11 in which the handles are fanned out.

FIGS. 11 and 12 show yet another preferred embodiment of the invention in which a set of nesting cups 160 includes an upper cup 162, and two stops in the form of posts 164 and 166 provided on a lower cup 174 as shown. Posts 164, 166 engage with walls of upper cup 162 as shown. As will be readily appreciated, in this embodiment, post 164 and 166 may be provided on an upper face of lower cup 174. As will be readily appreciated, the cups fan in only one direction, post 166 stops the fanning in the clockwise direction of FIG. 12, post 164 stopping the rotation in the counter-clockwise direction of FIG. 11, so as to align the handles in arrayed and aligned positions, thanks to the provision of outer downwardly extending walls 176 and 178 of upper cup 162, as shown.

Figure 13:
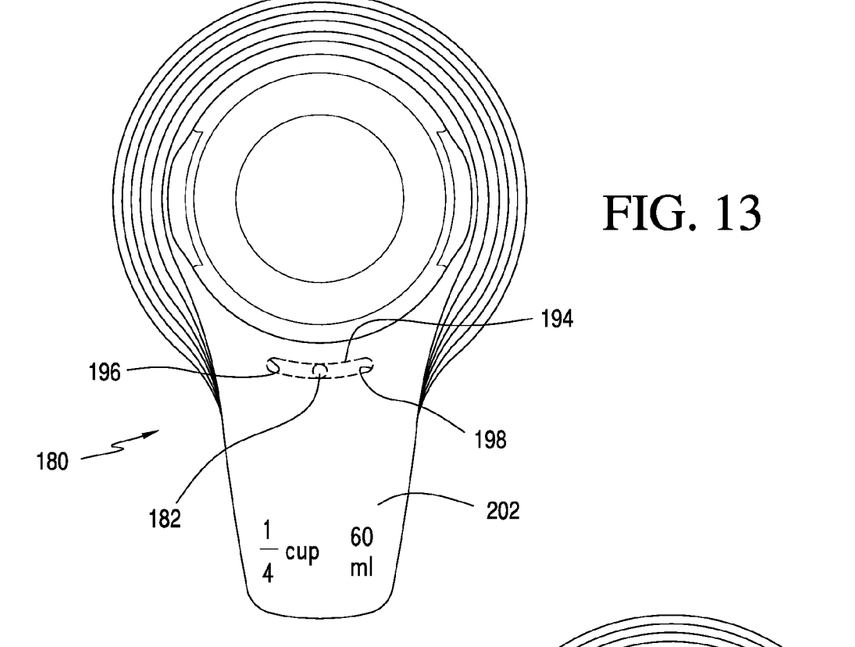
FIG. 13 is a top plan view of another embodiment of the invention with the handles aligned.
Figure 14:
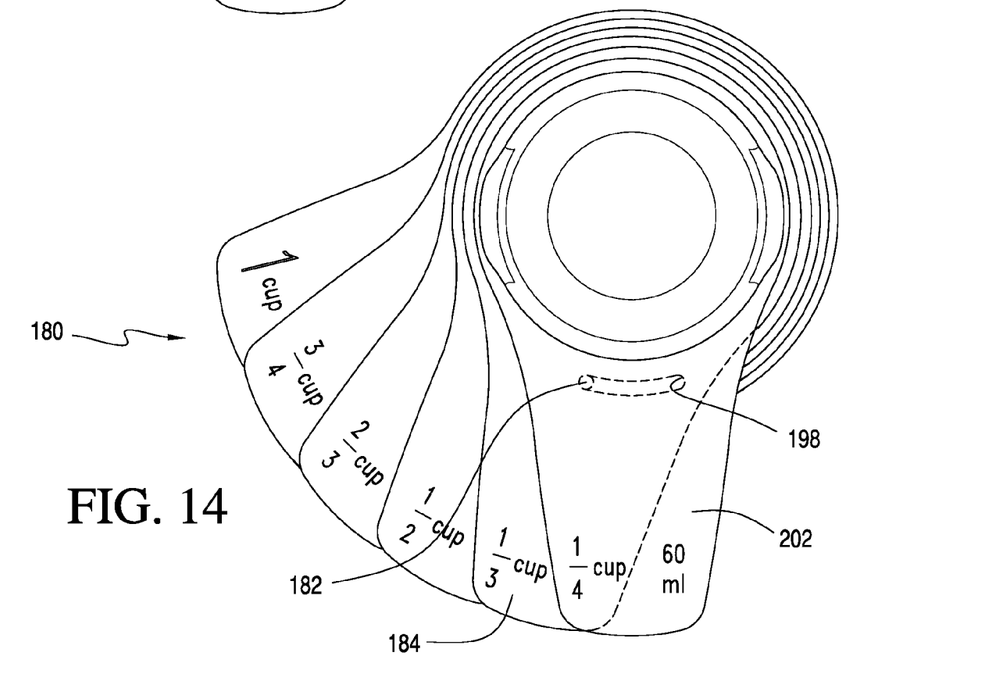
FIG. 14 is a top plan view of the embodiment of FIG. 13 in which the handles are fanned out.

FIGS. 13 and 14 show another preferred embodiment of a set of nesting cups 180 according to the invention. Nesting cups 180 include a stop in the form of a post 182 which may be provided on an upper face of the handle of a lower cup 184 ("the ⅓ cup") and a slot 194 having abutments in the form of end walls 196 and 198 which may be provided in a lower face of an upper cup 202, as shown. It will be appreciated, as in the other embodiments, that alternatively, slot 194 could be provided on lower cup 184 and post 182 could be provided on upper cup 202. Given the location of slot 194, end walls 196 and 198, and post 182, it will be seen that this set of nesting cups 180 may be fanned in both directions, i.e. clockwise and counter-clockwise. Thus, both English and metric measurements have been shown.

Figure 15:
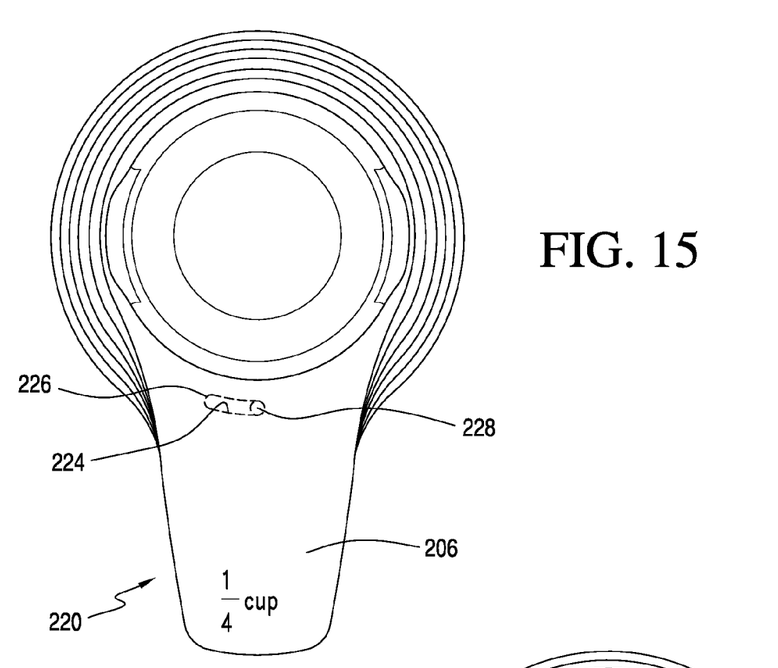
FIG. 15 is a top plan view of a further embodiment of the invention with the handles aligned.
Figure 16:
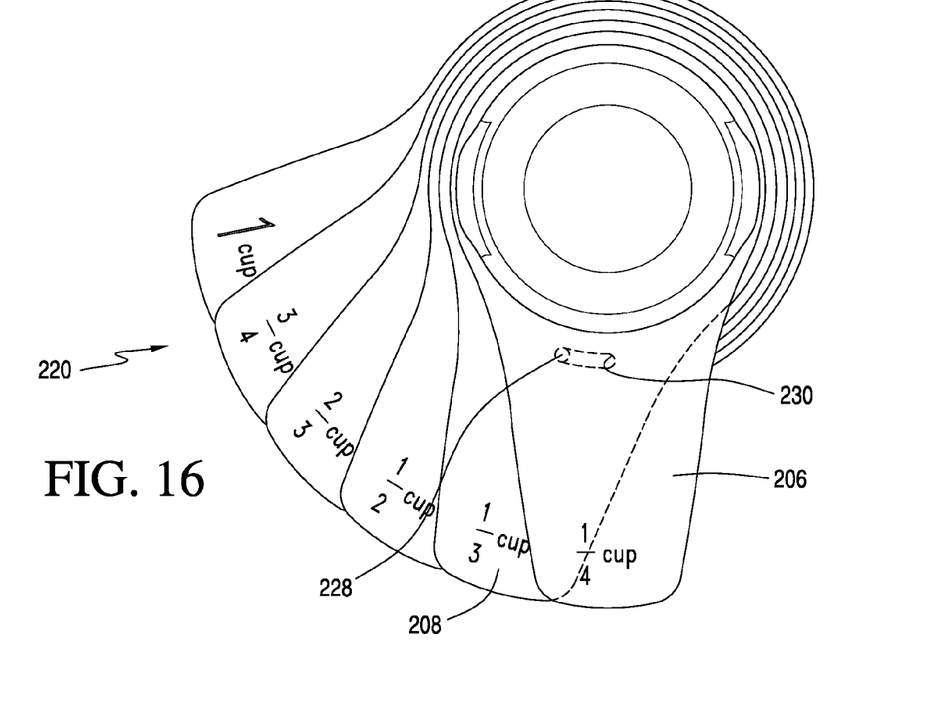
FIG. 16 is a top plan view of FIG. 15 in which the handles are fanned out.

FIGS. 15 and 16 show a further embodiment of cups 220 according to the invention. Cups 220 may include an upper measuring cup 206 and a lower measuring cup 208 located below cup 206 as shown. A slot 224 may be provided on lower face of upper cup 206, and slot 224 may be offset as shown, so that the cups fan in only one direction, such as the illustrated clockwise direction. When fanning, a stop in the form of a post 228 will engage one of spaced apart abutments in the form of end walls 226 and 230 of slot 224 depending on whether the cups are aligned as in FIG. 15 or are fanned out as in FIG. 16. As only one fanning direction is provided for in this embodiment, only one type of measurement need be provided on the cups, such as the illustrated English measurements. It will be appreciated that both English and metric measurements could be shown, as in the other embodiments which fan only in a single direction, depending on the user's preference.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A set of nesting measuring cups, comprising:
   a first measuring cup having a measuring portion for holding and measuring a first volume, a first handle provided on said first measuring portion, and said first measuring cup including an upper face and a lower face;
   a first pour spout provided adjacent to said upper face of said first measuring portion, said first pour spout having two spaced apart end walls defining said first pour spout;
   a second measuring cup having a second measuring portion for holding and measuring a second volume, a second handle provided on said second measuring portion, said second measuring cup including an upper face and a lower face, said second measuring volume being smaller than said first measuring volume, and said second measuring portion nesting inside said first measuring portion;
   a second pour spout provided adjacent said upper face of said second measuring portion; and
   a stop provided adjacent said lower face of said second measuring portion, said stop being engageable with an abutment adjacent said upper face of said first measuring portion, so that a user may rotate said second measuring cup relative to said first measuring cup until said stop engages said abutment for stopping the rotation of said second measuring cup relative to said first measuring cup with said first and second handles offset from each other in a fanned out position.

2. The set of measuring cups according to claim 1, wherein:
   said abutment includes at least one of said spaced apart end walls of said first pour spout, so that the user may rotate said second measuring cup relative to said first measuring cup until said stop engages said at least one end wall of said first pour spout for stopping the rotation of said second measuring cup relative to said first measuring cup with said first and second handles offset from each other in a fanned out position.

3. The set of measuring cups according to claim 1, wherein:
   said stop is engageable with said first pour spout of said first measuring portion, said abutment includes a first and a second end of said spaced apart end walls of said first pour spout, so that the user may rotate said second measuring cup in a clockwise direction relative to said first measuring cup until said stop engages said first end wall of said first pour spout for stopping the rotation of said second measuring cup relative to said first measuring cup in a first fanned out position, and so that the user may rotate said second measuring cup in a counter-clockwise direction relative to said first measuring cup until said stop engages said second end wall of said first pour spout for stopping the rotation of said second measuring cup relative to said first measuring cup in a second fanned out position.

4. The set of measuring cups according to claim 3, wherein:
   a first volume indicator is provided on said first handle;
   a second volume indicator is provided on said second handle; and
   said first and second volume indicators include English and metric measurements.

5. The set of measuring cups according to claim 1, wherein:
   a first volume indicator is provided on said first handle;
   a second volume indicator is provided on said second handle; and
   said first and second volume indicators include English and metric measurements.

6. The set of measuring cups according to claim 1, wherein:
   said stop includes a post provided on said first measuring cup, said first handle and second handle can be aligned, and said post is free of engagement with both end walls of said first pour spout when said first and second handles are aligned.

7. The set of measuring cups according to claim 1, wherein:
   said first measuring portion includes a further pour spout spaced apart from said first pour spout, said further pour spout includes first and a second spaced apart end walls;
   said stop includes a further stop engageable with said first and second spaced apart end walls of said further pour spout; and
   said abutment includes said two end walls of said first pour spout, and said abutment includes said first and second spaced apart end walls of said further pour spout, so that the user may rotate said second measuring cup in a clockwise or counter-clockwise direction relative to said first measuring cup until said stop engages one of said two end walls of said first pour spout and engages one of said first and second end walls of said further pour spout for stopping the rotation of said second measuring cup relative to said first measuring cup in a fanned out position or in an aligned position.

8. The set of measuring cups according to claim 1, wherein:
   said stop includes a post provided on said first measuring cup; and
   said abutment includes a first and second side wall provided on said second measuring cup, so that the user may rotate said second measuring cup in a clockwise or counter-clockwise direction relative to said first measuring cup until said stop engages one of said first and a second side walls of said second measuring cup for stopping the rotation of said second measuring cup relative to said first measuring cup in a clockwise or counter-clockwise fanned out position.

9. The set of measuring cups according to claim 1, wherein:
   said stop includes two posts provided on said first measuring cup; and
   said abutment includes a first and second side wall provided on said second measuring cup, so that the user may rotate said second measuring cup in a clockwise or counter-clockwise direction relative to said first measuring cup until one of said two posts engages a respective one of said first and second side walls of said second measuring cup for stopping the rotation of said second measuring cup relative to said first measuring cup in a respective fanned out or aligned position.

10. The set of measuring cups according to claim 1, wherein:
   a slot including first and second side end walls is provided on said second measuring cup;
   said stop includes a post provided on said first measuring cup; and
   said abutment includes said first and second side end walls of said slot, so that the user may rotate said second measuring cup in a clockwise or counter-clockwise direction relative to said first measuring cup until said post engages one of said first and a second end walls of said slot for stopping the rotation of said second measuring cup relative to said first measuring cup in a clockwise or counter-clockwise fanned out position, respectively.

11. The set of measuring cups according to claim 1, wherein:
   a slot including first and second side end walls is provided on said second measuring cup;
   said stop includes a post provided on said first measuring cup; and
   said abutment includes said first and second side end walls of said slot, and said slot is located so that the user may rotate said second measuring cup in a clockwise or counter-clockwise direction relative to said first measuring cup until said post engages a respective one of said first and second end walls of said slot for stopping the rotation of said second measuring cup relative to said first measuring cup in a clockwise or counter-clockwise fanned out or aligned position, respectively.

\* \* \* \* \*